No. 637,521.  
W. MITCHEL.  
KITCHEN UTENSIL.  
(Application filed June 27, 1899.)
(No Model.)
Patented Nov. 21, 1899.
2 Sheets—Sheet 1.
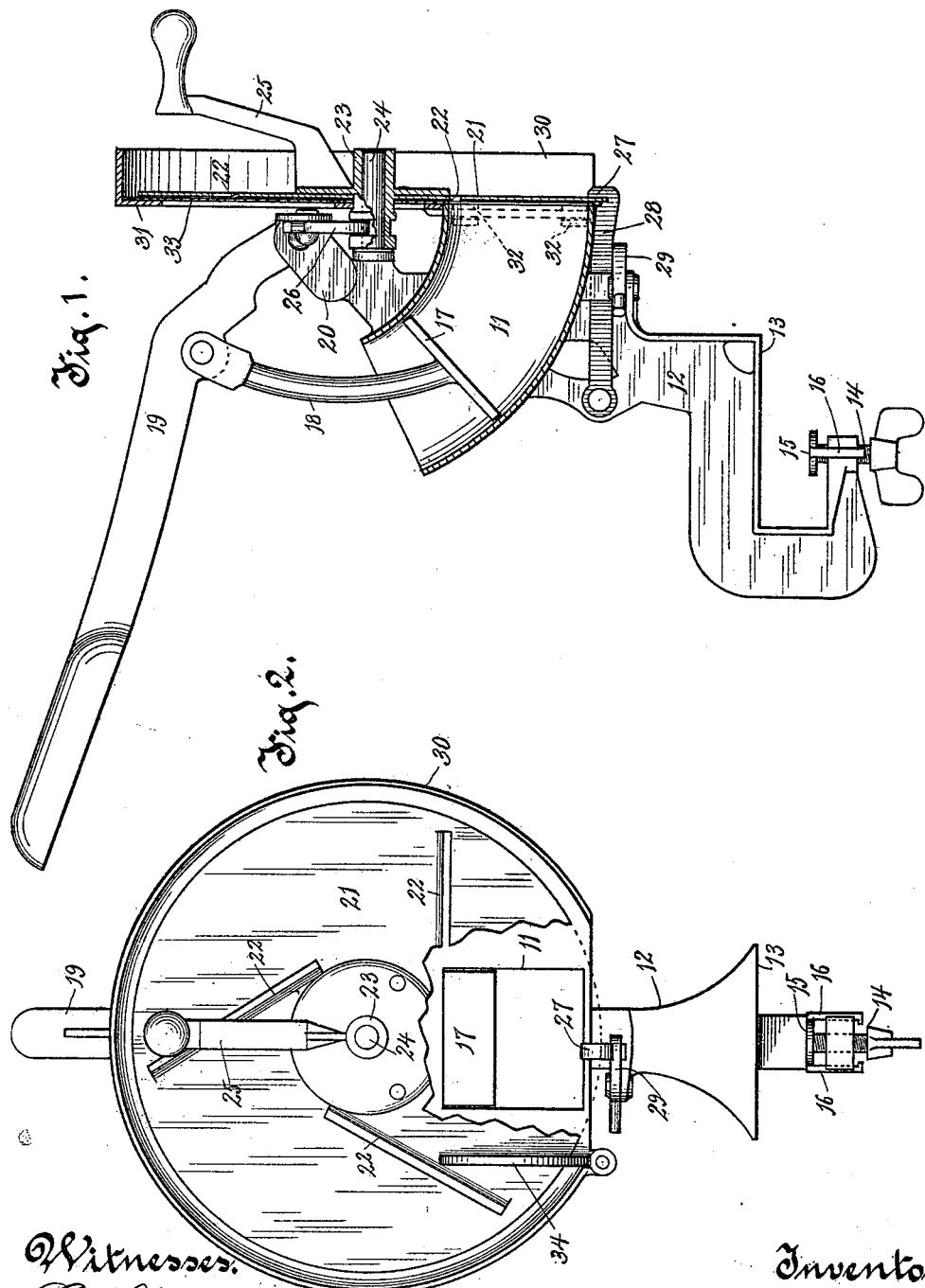

No. 637,521. Patented Nov. 21, 1899.
W. MITCHEL.
KITCHEN UTENSIL.
(Application filed June 27, 1899.)
(No Model.) 2 Sheets—Sheet 2.
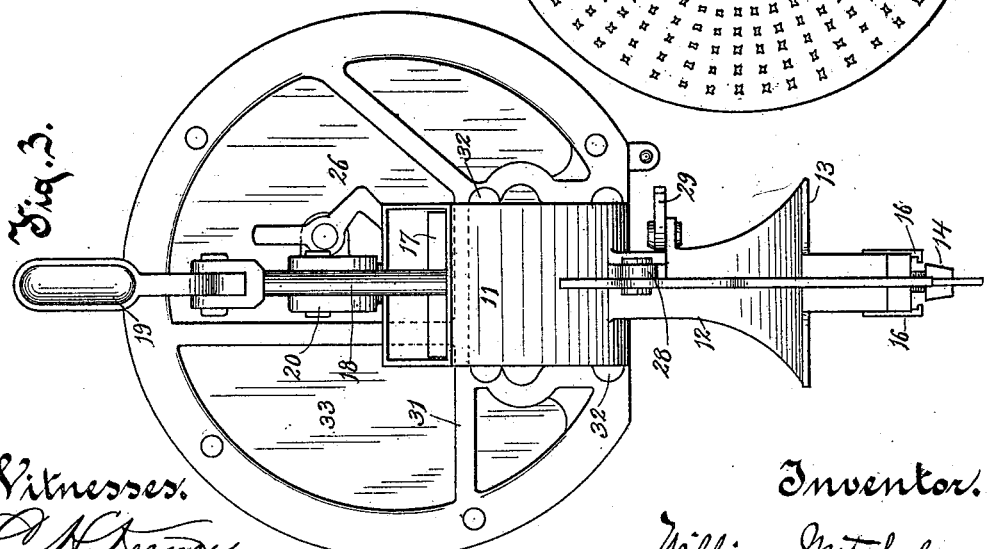

UNITED STATES PATENT OFFICE.

WILLIAM MITCHEL, OF KNEELAND, WISCONSIN, ASSIGNOR OF ONE-HALF TO AUGUST PETRIE, OF MILWAUKEE, WISCONSIN.

KITCHEN UTENSIL.

SPECIFICATION forming part of Letters Patent No. 637,521, dated November 21, 1899.

Application filed June 27, 1899. Serial No. 722,008. (No model.)

*To all whom it may concern:*

Be it known that I, WILLIAM MITCHEL, of Kneeland, in the county of Racine and State of Wisconsin, have invented a new and useful Improvement in Kitchen Utensils, of which the following is a description, reference being had to the accompanying drawings, which are a part of this specification.

My invention relates to an improved kitchen utensil which is especially adapted for slicing, grating, mashing, or pulverizing potatoes and vegetables and may be used for other operations in kitchen economy to which the utensil can readily be applied or for which, with slight changes, it is adapted to be used.

The utensil is made portable, being so constructed as to be readily secured detachably to a table or analogous article for convenient use.

The invention consists of the utensil, its parts, and combinations of parts, as herein described and claimed, or the equivalents thereof.

In the drawings, Figure 1 is a view of my improved utensil at one side, parts being shown in section for convenience of illustration. Fig. 2 is a rear end view of the utensil, parts being broken away to exhibit otherwise hidden features. Fig. 3 is a view of the front end of my improved utensil. Figs. 4 and 5 are a rear view and a central section, respectively, of a grater adapted to be used with my improved utensil. Figs. 6 and 7 are a front and an edge view, respectively, of a slicer or separator adapted to be used with my improved utensil. Fig. 8 is a view of a sieve or separator adapted to be used with my improved utensil. Figs. 9 and 10 are a section and a rear view, respectively, of a funnel or compressor adapted to be used with my utensil.

In my improved utensil a hollow case 11 is provided with a suitable leg or bracket 12, by which the utensil can be readily secured to and supported on a table or analogous article detachably. The leg 12 is provided with a proper foot surface or bearing 13, adapted to rest on the top of a table at its edge, and with a thumb-screw 14, turning through a toe of the foot underneath the edge of the table against a disk 15, provided with guides 16 16, which guides enter and slide endwise in recesses therefor in the toe of the leg. The disk 15 is adapted to be forced against the under surface of the table by the screw 14, whereby the leg 12 and its load are clamped detachably to and thereby supported on the table.

The hollow case 11 is segmental or curved longitudinally and is open normally at both extremities. A piston 17, fitted loosely in the case 11, is movable therein longitudinally thereof and is provided with a stem 18, that is pivoted to a lever-handle 19, the lever-handle being pivoted at one end to a bracket 20, fixed on the case 11. The construction is such that by raising the handle 19 sufficiently the piston 17 can be withdrawn from the case at the front end and on replacing the piston in the case by depressing the handle the piston will be moved toward and quite to the rear end of the case, which end of the case is cut off vertically, forming an open horizontally-disposed discharging-aperture. For this end of the case having the open discharging-aperture I provide means for slicing, grating, or otherwise cutting up or separating potatoes or vegetables.

In Figs. 1 and 2 I show a slicer 21, consisting of a disk provided with oblique slots having therein knives 22, set at an oblique angle to the face of the disk, which knives project slightly toward the case. The disk is provided with a hub 23, that is mounted on an arbor 24, projecting rigidly from the bracket 20. The arbor 24 is located above the discharging-aperture of the case 11, and the disk 21 is of such size and so mounted on the arbor 24 that it rotates close to and in front of the end of the case 11, whereby potatoes, vegetables, or any other articles of household use that may be placed in the case and forced to the rear in the case 11 by the piston 17 will come against the knives 22 on the disk 21, and as this is rotated will be cut or sliced up, the slices passing through the slots in the disk adjacent to the knives 22. The disk or slicer 21 is provided with a crank-handle 25, whereby it is conveniently rotated. The slicer is held in position rotatably on the arbor 24 by a swinging latch 26, pivoted on the bracket 20 and arranged to fall into an annular channel therefor in the hub 23. By lifting the latch 26 the slicer can be removed from the arbor 24. As the slicer-disk 21 is of considerable size and as it is important to hold the disk near to the end of the case 11, I provide a bearing for the outer surface of the disk at its perimeter below the lower edge of the case 11, this bearing consisting of a lip 27 on the free end of an arm 28, hinged on the leg 12. This arm is adapted to be thrown up in position against the lower surface of the case and when in this position the lip 27 comes at the rear of the case and behind the disk 21, against which lip the disk bears as it rotates and is thereby held against escaping from its position close to the end of the case 11. The arm 28 is held up to its seat against the case 11 by a block 29, pivoted on the leg 12 and adapted to be swung under the lever 28 when it is in position against the case 11 and to be withdrawn from supporting the arm 28 and permit it to drop down away from the case and from the disk 21 for the purpose of releasing the disk 21 and permitting it to be removed from the arbor 24 for the purpose of cleaning it or otherwise.

To prevent the material that has been sliced off or separated from the potato, vegetable, or mass in the case 11 as it escapes through the slots in the slicer from being scattered about, I provide a guard 30 in the general form of a rim about and projecting rearwardly from the slicer, which guard or rim is a part of a frame 31, adapted to pass down over and about the hub 23 when on the arbor 24 and down upon and fitted to the case 11, the case being preferably provided with lugs 32 32 in pairs, between which edges of the frame are received, sliding therein to place and being held thereby to vertical position over and about the slicer-disk. The guard is also provided with a thin sheet-metal back 33, the back being cut away to permit the guard to slide down over the hub 23 and over the end of the case 11. It will be noted that the rim of the guard is cut away below the case 11, so as to permit material to fall freely from the knives after it has passed through the disk 21. I also preferably provide an auxiliary guard 34, consisting of a narrow plate secured at its lower end to the guard 30 and extending upwardly therefrom a little in front of the disk 21 and at that side of the discharge-opening from the case 11 toward which the knives move after passing the case-aperture, the auxiliary guard being adapted to catch and brush off from the disk any portions of material that may cling to the disk after passing through the knife-slots.

Instead of the slicer 21 (shown in Figs. 1 and 2) there may be employed a disk grater 35, of the form shown in Figs. 4 and 5, which instead of being provided with slots and obliquely-disposed knives is provided with a roughened surface and apertures adjacent to the sharp roughened edges about these apertures, which being mounted on the arbor 24 in the same manner as the slicer-disk 21 is adapted to abrade and thereby to cut up or separate the material forced against it in the case 11 while the grater is being rotated. The slicer 21 and the grater 35 are only varying forms of a cutting-up or separating device adapted to be mounted on the arbor 24 and to be used by rotating them in front of the discharging end of the case 11 against material held thereto in the case by means of the piston 17. Also, instead of the slicer or grater there may be used with the case 11 another form of slicer or separator, consisting of a frame 36 of substantially the same size as the open end of the case 11, which frame 36 is provided with fine wires 37, stretched across the frame from side to side thereof. This frame is provided with a hub 38, adapted to fit on the arbor 24 and to be locked in place by the latch 26, and is also adapted to be engaged at its lower end by the lip or catch of the arm 28, and thereby held in place at the front end of the case 11.

In Fig. 8 another form of separating device is shown, consisting of a perforated plate 39, adapted to be secured over the open end of the case 11 in substantially the same manner as the slicer-frame of Fig. 6 is secured thereto.

In Figs. 9 and 10 a funnel 40 is shown, which, instead of the slicer-frame of Fig. 6 or the perforated plate of Fig. 8, may be secured to the case over the rear discharging end thereof, the funnel being adapted for compressing and discharging any material that may be forced through it from the case and is especially adapted for compressing and discharging sausage-meat or any other hashed, plastic, or comminuted material.

It will be understood that this utensil having a variety of material separators is adapted for many uses in a kitchen and that its construction is such that its parts can be separated or entirely removed from each other, whereby it can be cleaned with the utmost facility.

What I claim as my invention is—

1. In a kitchen utensil, the combination with a hollow case having an open discharging end, and a piston reciprocable therein, of an arbor at one side of the open end of the case projecting in the direction of the length of the case, a material-separating disk mounted revolubly on the arbor, and a releasable arm having a bearing-lip arranged to hold the disk to its place at the rear of the case.

2. A portable kitchen utensil, comprising a curved hollow case open at both ends, means for supporting the case, a piston movable longitudinally in the case, a lever-handle hinged at one extremity approximately at the axis of the curve of the case, a piston-stem connected to the handle medially, an arbor rigid on the case projecting across the plane of the discharging end of the case, a material-separator provided with a hub fitted detachably on the arbor, said hub being provided with a groove, a latch hinged on the case adapted to enter the groove in the hub and hold the separator in position detachably and an arm hinged on the case, the arm being provided with a lip adapted to engage releasably the distant edge of the material-separator and hold it in place.

In testimony whereof I affix my signature in presence of two witnesses.

WILLIAM MITCHEL.

Witnesses:
   C. T. BENEDICT,
   ANNA V. FAUST.